Patented Apr. 9, 1946

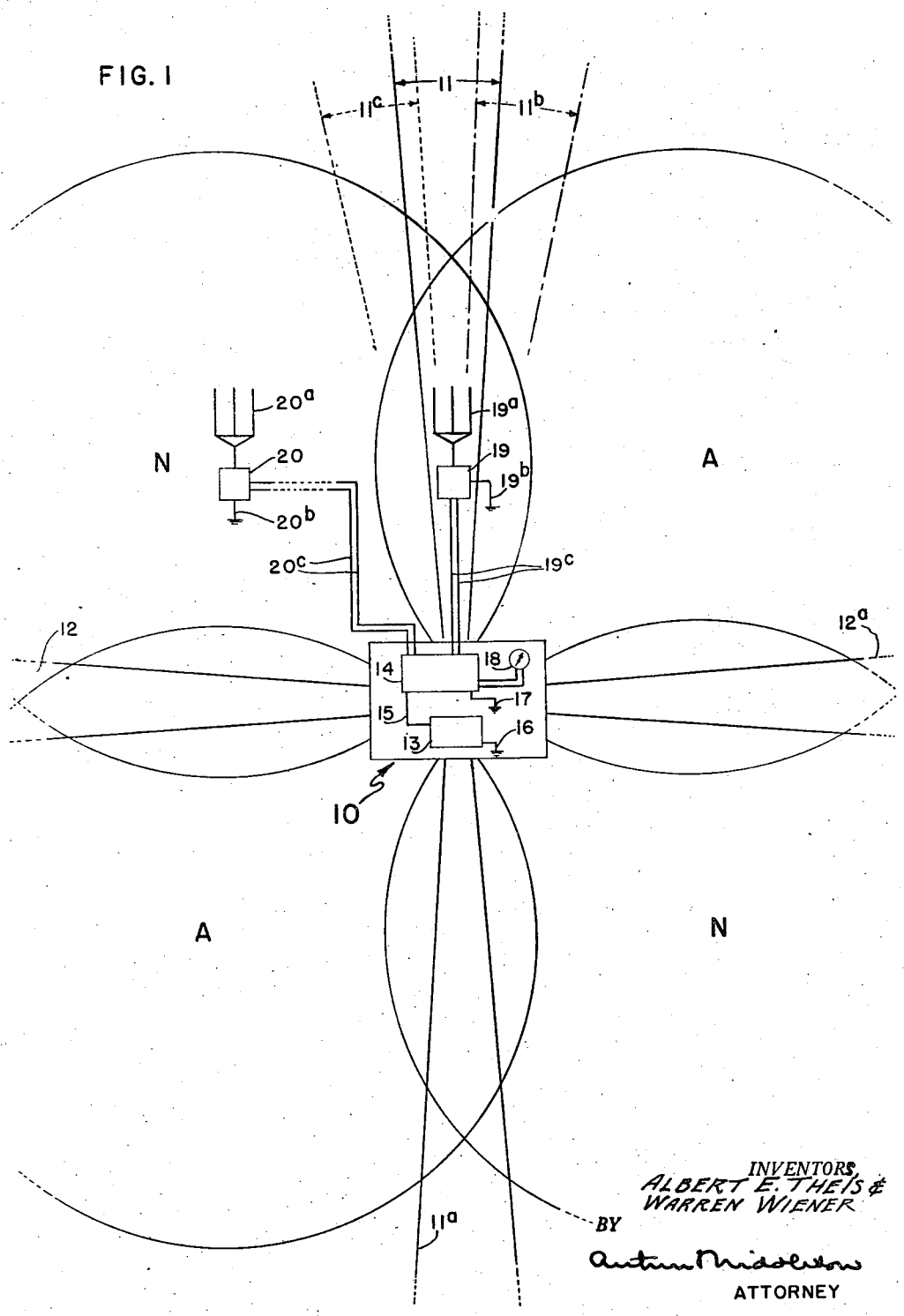

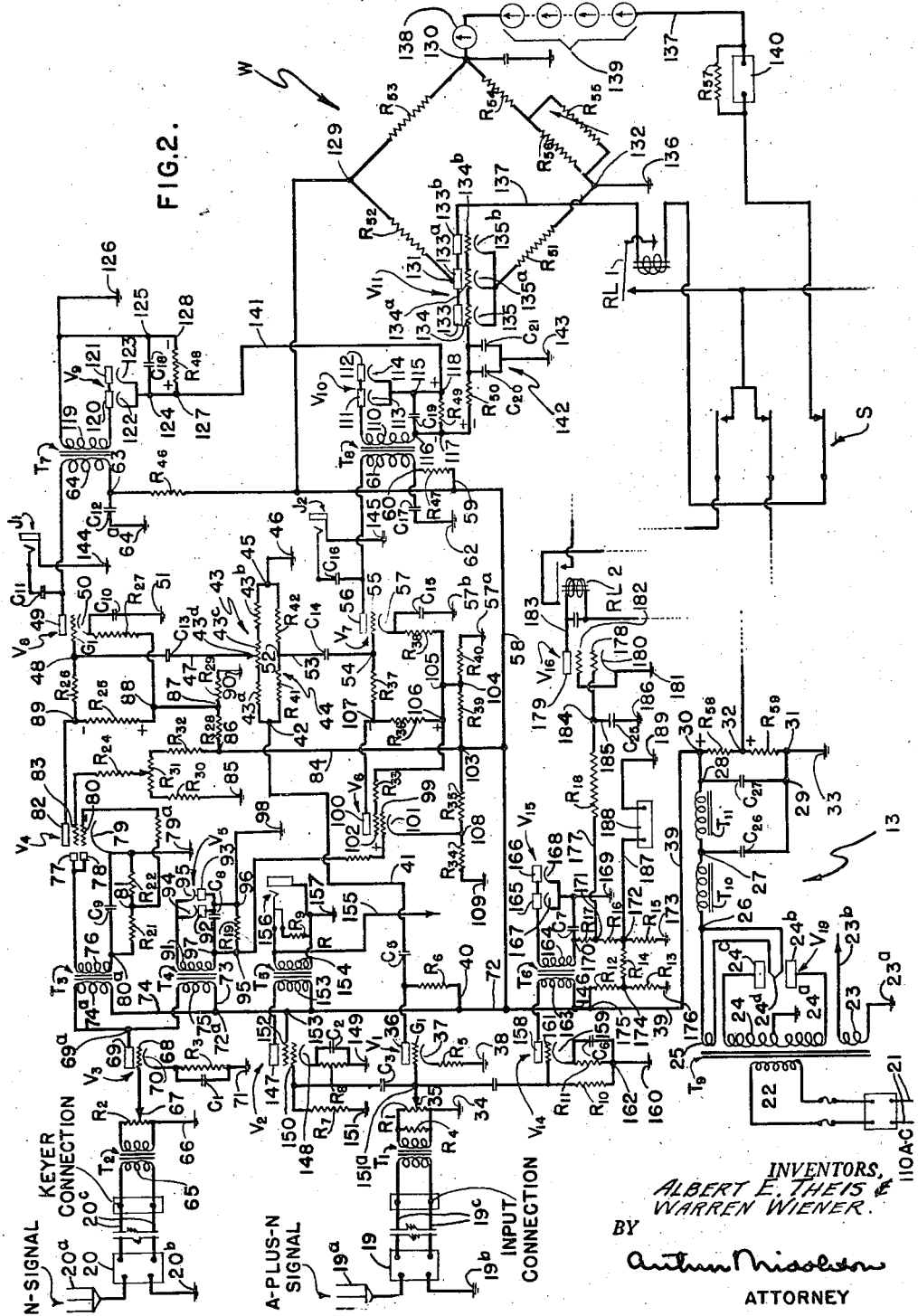

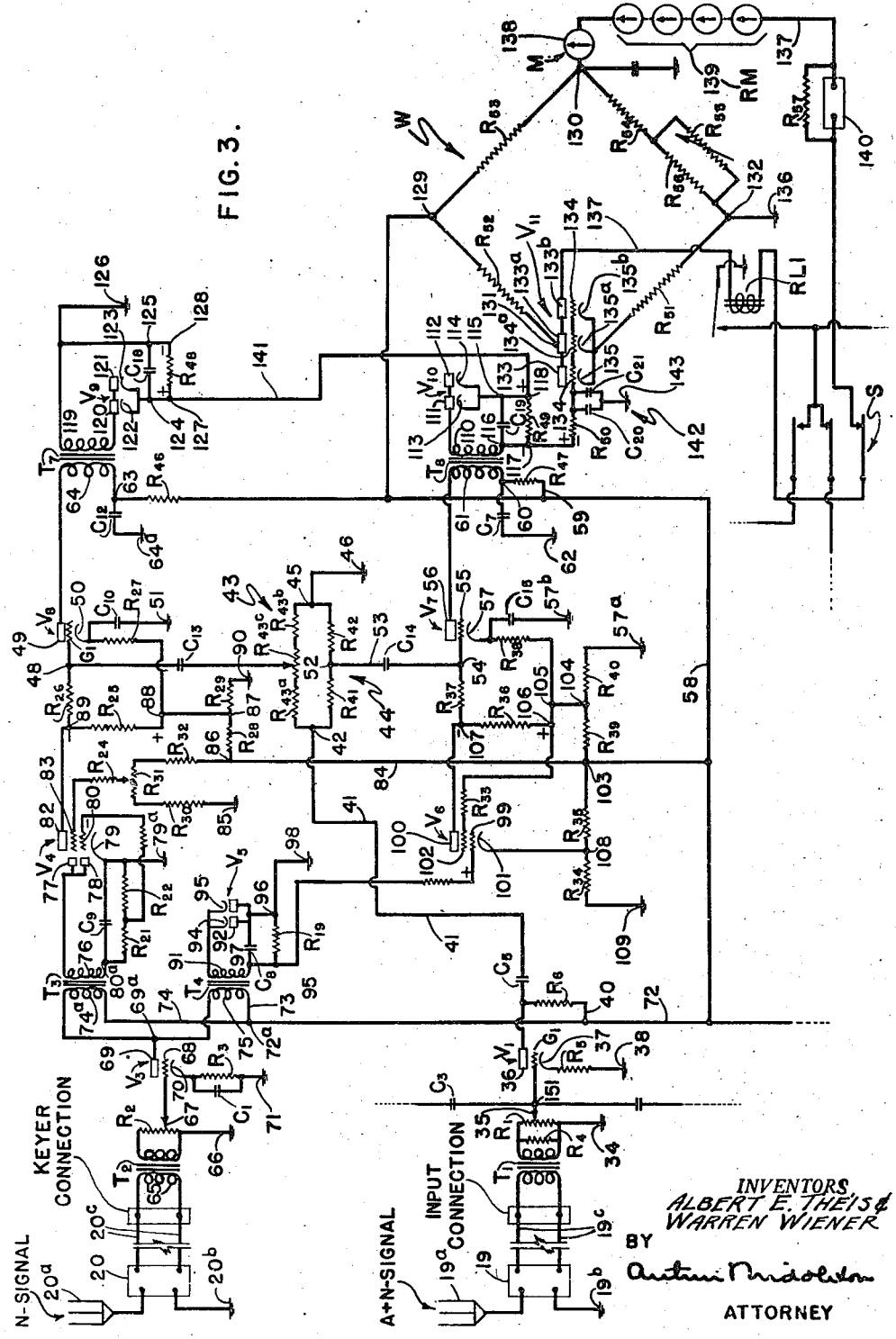

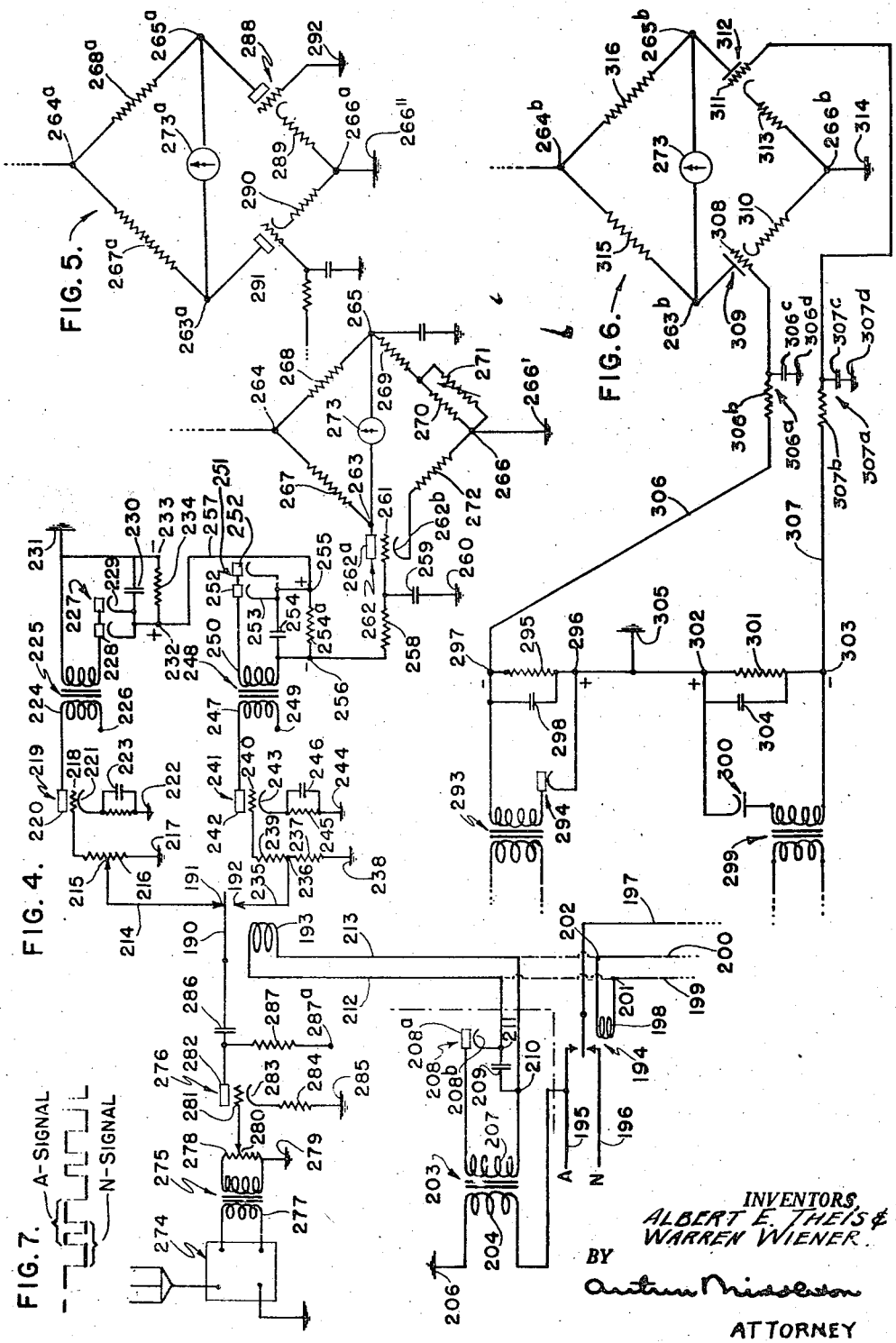

2,398,335

UNITED STATES PATENT OFFICE 2,398,335

RADIO RANGE

Albert E. Theis and Warren Anthony Wiener, Islip, N. Y.

Application January 25, 1944, Serial No. 519,588

19 Claims. (Cl. 250—11)

This invention relates to radio direction finders also known as radio beacons or radio ranges which enable aircraft to obtain their bearings relative to a fixed course or radio beam represented by a continuity of signals emanating from a transmitter at a steady strength. Certain changes in strength of the incoming signals indicate to the aircraft its deviation from the beam or on-course, and enable them to rectify their course accordingly until the full strength signals are again being received.

The invention more specifically deals with a monitor system for indicating and correcting spontaneous direction shifting or aberrations of the radio beam from its theoretically fixed position.

The principle of establishing the radio beam is known and may be termed the principle of the interlocking A- and N-signals, the A-signal being sent in one direction and the N-signal in a direction substantially at right angles thereto. This produces with respect to the transmitter a pair of opposed A-signal fields along one axis, and along an axis at right angles thereto a pair of opposed N-signal fields. These will herein be called briefly A-field and the N-field respectively. The A- and the N-signal are audible per se in their respective fields as dash-and-dot or long-and-short (— -) and as dot-and-dash or short-and-long (- —) signals respectively. However, due to overlapping or intersecting of adjoining A- and N-fields, there is created a restricted or "beam" area in which both signals merge and are audible simultaneously, namely as mixed signal, that is, as a steady hum or continuous dash due to the manner in which they are timed or interlocked or keyed with respect to each other.

This beam represents the on-course for the aircraft, and the signal heard on it as a steady hum represents the one-course signal. As the aircraft deviates from the course towards or into either the A-field or the N-field, it will receive a deteriorated on-course signal, that is, a mixed signal in which either the A-component or the N-component is heard as the stronger one, as the case may be. If the craft deviates well into the A- or the N-field, the respective A- or N-signals will be heard exclusively. The craft may rectify its course accordingly until the steady on-course signal is again heard.

Due to various influences which are atmospheric-electrical, or inherent to the functioning of the sending station, the beam direction is subject to spontaneous variations or aberrations which are undesirable and confusing in the operation of the system, especially since they may remain undetected, misleading the aircraft pilot as well as the ground personnel.

Expressing this environment somewhat differently, these radio courses or beams are obtained by radiating in different directions a pair of modulated fields of figure-8 shape. The intersections of the figure-8 fields form the desired courses or beams. One of the fields is modulated by a signal which forms a dot-space-dash or telegraphic signal A (- —). The other field is modulated by a dash-space-dot, or telegraphic signal N (— -). The space intervals are of the same duration as the dots, and the dashes are of the same duration as the space between successive A's and N's.

The space fields are keyed alternately so that, where the fields intersect and are of equal intensity, the A- and N-signals interlock and the resultant signal is a continuous dash or hum. A radio receiver positioned or moving along the course will receive the steady modulation note or continuous "dash" or "hum." Graphically, therefore, the keying or interlocking of the A- and N-signals appears as follows:

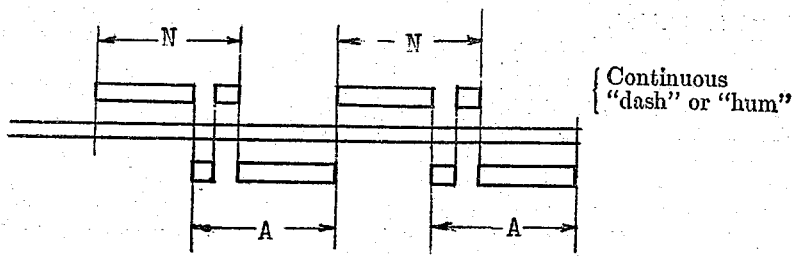

If the radio receiver is slightly to the right or left of the course, the A (- —) or the N (— -) signal, as the case may be, will predominate. If the receiver is entirely off the course, only an A- or N-signal will be received.

A condition which also bears upon the invention, and constituting a part of the background thereof, is due to the periodical interruption of the normal beam signal by a station identification signal. That is to say, as now practiced, the beam signal usually alternates with the station identification signal in an interlocked or keyed fashion, each signal running for a 30-second period.

Considerable difficulty has been exprienced in maintaining course accuracy over periods of time. It has been recognized that a minute change of tuning in one of the antennas for any reason, such as the effect of nearby objects, faulty or dirty insulators, etc., during wet weather, will result in change in phase angle between the antenna currents. This causes unintentional shifting of the airway courses and impairs considerably the safety of an aircraft.

It has also been found that frequently considerable shifts in course take place, which are caused by conditions other than those resulting from antenna detuning, and lives and aircraft have been lost which have been definitely attributed to these causes, such as atmospheric storms and night effects.

Other causes masking or affecting the correctness of the on-course position of the beam are faulty keying or interlocking of the A- and N-signals, absence or poor keying of the station identification signal, or reductiton of power output with attendant weakening of the beam signal.

Under the conditions referred to, the pilot has no means of knowing whether the operation of the system is such as to provide a proper course to fly by.

It is among the objects of this invention to provide a method and means for indicating aberrations of the beam from its predetermined direction, so that a corresponding adjustment may be effected at the sending station, to compensate for that directional fault; and to warn the operator of the system when the station is operating improperly in order that he may make the necessary adjustments or repairs and may advise the pilots as to what to do; and to provide means for indicating at the transmitting point and/or at any remote locations the condition of the radio range and to supply both visual and aural alarms when faults occur to the radia range station and also to automatically warn the pilot.

Another object is to provide a means for aligning or restoring the proper direction of the courses when they have been disturbed, eliminating or reducing the need for tedious flight checks.

Another object is to provide automatic means whereby interfering actions between the beam monitor system and the station identification signal is avoided.

Still another object is to provide means that are automatically responsive to faults not necessarily directional affecting the beam, such as faulty keying or interlocking of the A- and N-signals, faulty keying or absence of the station identification signal, or reduction of power output, weakening of the beam signal.

Some of these objects are attained by way of providing a stationary or pilot receiver herein also called the input-receiver which is placed in the path of a predetermined directional beam. This receiver will absorb mixed or interlocked A- and N-signals from the beam, with either the A- or the N-component the stronger one depending upon the spontaneous directional shifting of the beam relative to the position of the receiver. The differential of strength of the two component signals thus received is utilized for the purpose of establishing a measure or an indication of the directional fault of the beam. This fault may be corrected for instance by a corresponding directional adjustment or tuning of the sender antenna, such as automatic control by means of the monitor bridge circuit rotation of the goniometer, cut in various values of resistance in either the antenna, or course bending antenna circuits, or shifting the phase of any antenna or antennas.

That is to say, objects of the invention are attained by feeding the on-course signal from the input receiver to a pair of parallel signal channels. One of the channels has associated with it means for discriminating against the A-signal component, the other channel has associated with it means for discriminating against the N-signal component. Additional means are provided for establishing the differential of strength between the two component signals emerging from the respective channels.

This invention provides devices for separating or segregating the A- and the N-components of the mixed signal coming from the input-receiver, and evaluating their respective strength in terms of corresponding or equivalent indicating D. C. voltages. The differential of these voltages is utilized to indicate or to help correct the directional fault or aberration of the beam.

More specifically, the A- and N-signal components of the beam or input signal are segregated from each other by way of a pair of input-amplifier circuits disposed in parallel and keyed relative to the beam signal in such a manner that the A-component is diverted into the one circuit and the N-signal component diverted into the other circuit.

One method of effecting the segregation of the A- and N-components is by feeding the beam signal from the input-receiver (herein also termed the on-course receiver) to a pair of parallel amplifier circuits, while blocking the A-component in the one circuit and blocking the N-component in the other circuit with the aid of bias derived from auxiliary electronic circuits.

Further particularized, each of the parallel amplifier circuits is coupled with a rectifier circuit, whereby the component signals emerge as separate D. C. voltages substantially in proportion to the strength of their respective signal components. Means are provided for establishing the differential of these voltages as an indication or a measure of the beam aberration.

Some features of the invention relate to the keying means for effecting the separation of the component signals, that is to the manner of separating the A- and N-components of the mixed signal coming from the input-receiver; other features relate to the manner in which the separated components are utilized to produce a resultant indicating or corrective impulse based upon their differential of strength.

According to one feature, a stationary auxiliary receiver herein also called the keyer-receiver, is placed in an off-beam position, that is beyond the influence of the beam or mixed signal, namely either well within the A-field or the N-field, as the case may be. This receiver in absorbing a steady strength component or auxiliary or keyer signal, furnishes the means or bias for blocking the A-signal in one amplifier circuit of the beam signal as well as for blocking the N-signal in a parallel input amplifier circuit, thereby in effect separating the component signals from each other.

Substantiating this feature, as according to one embodiment, such blockages and separation of the component signals are effected by: treating the beam or on-course signal in a pair of parallel amplifier circuits herein also called the input amplifier circuits; treating the auxiliary component signal herein also called the keyer signal in a pair of parallel keyer rectifier circuits or keyer branches each to produce rectified keyer signal pulses; and deriving from one keyer branch the bias for blocking the A-signal component while deriving from the other keyer branch the complementary or opposite bias for blocking the N-signal component. That is to say, in the one circuit a positive bias appears in synchronism with the one component signal, and in the parallel circuit a negative bias appears in synchronism with the other component signal.

In effect, the one blockage is thus derived concurrent with the keyer signal pulses, while the other blockage is derived concurrent with the spaces of the keyer-signal.

A feature in the operation of the two keyer branches is that the positive bias is applied to one, and the negative bias to the other of a pair of auxiliary or keyer amplifier circuits. This drives the keyer amplifier circuits to cut-off in synchronism with the A- and the N-signal respectively, where by they in turn control bias upon the respective input amplifier circuits in a manner to effect in them the desired blockages and hence separation of the component signals.

According to still another feature, the bias-controlling means effective between the keyer-amplifier circuits and the input-amplifier circuits comprise a resistance in the path of each keyer-amplifier circuit, which resistance is also connected with and interposed between the grid and the cathode of the associated input-amplifier circuit. This interconnection puts bias upon the respective input-amplifier circuits while the keyer-amplifier circuits are alive, but places the grid and cathode of the input amplifier circuits at even potential during cut-off of the keyer-amplifier circuits.

According to another feature, the separated A- and N-signal impulses are converted by rectification in a manner whereby they emerge as simultaneously occurring continuous D. C. voltages. The differential of these voltages is utilized to establish a measure or indication of the degree of aberration of the beam, and to apply a corrective.

More specifically, this differential is utilized by causing it to effect a proportionate degree of unbalance in a Wheatstone-bridge balancing system. The resulting bridge current being a measure of the degree of aberration of the beam, serves in applying the corrective.

In one embodiment, the Wheatstone-bridge balancing system has in one of its branches in lieu of a resistance an electronic tube in which the relative polarity of the grid and of the cathode is influenced by the differential of D. C. voltages which result from individual rectification of the separated different strength A- and N-signal impulses.

The preceding features are embodied in the following procedure:

A course monitor receiver or input-receiver is located a suitable distance from the radio range station and on the final approach leg to the airport. The output of this receiver is connected through a telephone line to the monitor system at the airport. The signal received is normally a steady signal produced by an interlocked A- and N-tone. If the course shifts, a difference in signal strength between the A- and N- will appear. Course deviation is indicated by measuring the difference in strength between the A- and N-signals.

To measure and compare the strength of the A- and N-components, they are first divided and then fed into two separate channels. There they are amplified and rectified and the D. C. outputs of the two channels are combined in opposite polarity and fed to a balanced bridge circuit. When the transmitter is on-course, the outputs of the A- and N-channels are equal and opposite, producing zero voltage to the bridge. When the course shifts, the rectified outputs differ and the resulting positive or negative voltage unbalances the bridge causing the zero center meter to operate.

To divide the on-course signal into its original components, an auxiliary receiver (keyer receiver) is used. This receiver is placed in an off-course sector and provides pulses which alternately bias to cut-off the two separate channels in synchronism with the transmitted signal, thus allowing one amplifier to operate during the A-signal, and the other during the N-signal.

According to another feature, dividing the on-course (A-N) signal into the respective A- and N-channels is effected by using the transmitter signal or the transmitter timer switch for energizing a solenoid controlled distributing or vibrating switch in synchronism with component signal impulses. In this way the input signal is mechanically switched into the respective channels to effect separation into the component signals.

Still other features have to do with special advantageous arrangements within the Wheatstone-bridge system that is used for establishing the monitor circuit.

The invention possesses other objects and features of advantage, some of which with the foregoing will be set forth in the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto. Especially, for the purpose of segregating the A- and N-signal components from the beam signal, the purpose of this invention is not limited to the use of the auxiliary or keyer receiver and its associated electronic keying circuits, since the segregation of these component signals may be effected in other ways, for instance by picking up the keying impulses directly from the range transmitter by a simple rectifier or using the currents that operate the relay which keys the A-N signal at the transmitter.

The term keying means as herein used is to be understood and interpreted in its broadest sense, and in a sense to cover any means or systems or sub-combinations whereby the parallel branches or parallel amplifier circuits of the beam signal can be controlled in such a manner as to pass only the respective segregated A- and N-component signals.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a diagram showing the A- and N-fields emanating from a sender, and the disposition of the fault indicating and correcting equipment relative to these fields.

Fig. 2 is a wiring diagram of the fault indicating and correcting equipment.

Fig. 3 is an enlarged view of the more basic parts of the wiring diagram.

Fig. 4 shows a modification in the keying to effect the separation of the component signals.

Figs. 5 and 6 show modifications in the arrangement of the Wheatstone-bridge system which serve in establishing the monitor circuit.

Fig. 7 is a diagram indicating the manner in which the A- and N-component signals interlock.

According to Fig. 1, the sender station 10 is indicated by the presence of a pair of A-fields and a pair of N-fields illustrated in the customary manner and designated by the letters A and N. The partial overlapping or intersecting of A- and N-fields establishes the beams 11 and 11a, and 12 and 12a, which may serve as directional guides for aircraft. The signal representing the beam is the so-called on-course signal, represented by a continuous hum, produced by the interlocking or mixing of the A- and N-signal, when both these component signals are equally strong.

The numerals 13 and 14 designate a D. C. power supply unit or power pack and the control or monitor unit proper respectively, both being in circuit as indicated by a conductor 15 on the one hand and the grounds 16 and 17 on the other hand. The fault indicating function of the monitor unit 14 is illustrated by way of a current indicating instrument or meter 18. The fault indicating and measuring devices further include what is herein termed the input-receiver 19 with antenna 19a and ground 19b disposed in the path of the beam 11, and another receiver herein termed the keyer-receiver 20 with antenna 20a and ground 20b disposed to receive a steady strength component signal and therefore located off course, that is, well beyond the influence of the interlocked or composite signal of the beams 11 and 12. Both receivers 19 and 20 are shown to be wired to the control or monitor unit 14 as at 19c and 20c respectively.

The power unit 13 of Fig. 1 serves to convert line current such as 110 volt A. C. current into a D. C. current suitable as an operating supply current for feeding to the electronic tubes of the monitor system. The power conversion unit 13 is of a known type and in Fig. 2 it is shown to comprise the A. C. line conduits 21, a transformer $T_9$ comprising primary coil 22 and secondary coils 23 (filament coil), 24 (coil of rectifier circuit), 25 (filament coil for tube $V_{19}$). Coil 23 has a ground 23a and a lead 23b. The coil 24 has a ground 24a and is in circuit with an electronic tube $V_{19}$ having a pair of anodes 24b and 24c and a cathode 24d which is in circuit with coil 25. The circuit comprising the cathode 24d and the coil 25 has a terminal point 26 to which connects a choke coil $T_{10}$, the opposite terminal 27 of which connects to choke coil $T_{11}$ which in turn has a terminal point 28. Furthermore, in this diagram a point 29 has between it and point 27 a condenser $C_{26}$ and between it and point 29 a condenser $C_{27}$. In parallel with condenser $C_{27}$ are resistances $R_{58}$ and $R_{59}$ between terminals 30 and 31, a terminal 32 being provided between these resistances. The terminal point 31 has a ground 33. The D. C. operating voltage furnished by the power conversion unit 13 and available for operation of the electronic tubes of the monitor system 14, is represented by the terminals 30 and 31, and intermediate voltage being available at terminal 32.

In the monitor system (see wiring diagrams Figs. 2 and 3) the input-receiver 19 with its antenna 19a and ground 19b, through conduits 19c is wired to the primary coil of a coupling transformer $T_1$, the secondary coil of which is in circuit with a tuning control resistance $R_1$ and a parallel resistance $R_4$. The parallel resistances $R_1$ and $R_4$ are grounded as at 34. A tuning control contact 35 connects the resistance $R_1$ with the grid $G_1$ of an electronic tube $V_1$ having an anode 36 and a cathode 37 grounded at 38 and provided with resistance $R_5$. The tube $V_1$ is supplied with D. C. operating current from supply conduit 39 through branch 40 provided with resistance $R_6$.

The mixed (A— plus N—) signal received from the input-receiver 19 by the tube $V_1$ passes over a condenser $C_5$ and a conductor 41 to a point 42 at which it splits into parallel branches 43 and 44 which rejoin at point 45 which is grounded as at 46. The one parallel branch 43 comprises resistances 43a and 43b and between them a tuning resistance 43c having a tuning contact 43d. From the tuning contact 43d a connection 47 leads over a condenser $C_{13}$ and point 48 to the grid $G_1$ of an electronic tube $V_8$ which further comprises an anode 49 and a cathode 50 which has resistance $R_{27}$ and is grounded as at 51 over a condenser $C_{10}$. The other parallel branch 44 comprises resistances $R_{41}$ and $R_{42}$ having between them an intermediate point 52 from which connection 53 leads over condenser $C_{14}$ and point 54 to grid 55 of an electronic tube $V_7$ having an anode 56 and a cathode 57 provided with resistance $R_{38}$ and grounded as at 57a over additional resistance $R_{40}$. A condenser $C_{15}$ through ground 57b is in parallel with the resistances $R_{38}$ and $R_{40}$.

The tube $V_7$ is supplied with D. C. operating current from line 58 over branch 59, resistance $R_{47}$, point 60, primary coil 61 of a coupling transformer $T_8$, the point 60 being grounded as at 62 over a condenser $C_{17}$. The tube $V_8$ is supplied from line 58 over resistance $R_{46}$, point 63, the primary coil 64 of a coupling transformer $T_7$, the point 63 being grounded as at 64a over a condenser $C_{12}$.

The keyer-receiver 20 with its antenna 20a and ground 20b, is wired to the primary coil 65 of a coupling transformer $T_2$, the secondary coil of which is in circuit with a tuning resistance $R_2$ grounded as at 66. A tuning contact 67 feeds the signal to the grid 68 of an electronic tube $V_3$ having an anode 69 and a cathode 70 provided with resistance $R_3$ grounded as at 71 and in parallel with a condenser $C_1$. The tube $V_3$ is supplied with D. C. operating current from line 72 at point 72a over two branches 73 and 74, those branches being disposed between points 72a and 69a of the supply line 72, the branch 73 comprising the primary coil 75 of a coupling transformer $T_4$, the branch 74 comprising the primary coil 74a of a coupling transformer $T_3$.

Thus, the steady strength component signal (which, as an example, is assumed to be the N-signal) from the keyer-receiver 20 is fed over coupling transformer $T_3$ to an electronic tube $V_4$ which is a combination rectifier- and amplifier tube. That is to say, the secondary coil 76 of the coupling transformer T3 is in circuit with the tube V4 by way of twin anodes 77 and 78, cathode 79, and grid 80, a condenser C9 in parallel with a pair of resistances $R_{21}$ and $R_{22}$ between terminal point 80a of the secondary coil 76 and the cathode 79 having ground 79a. A point 81 between the resistances $R_{21}$ and $R_{22}$ establishes a desired negative bias voltage upon grid 80 of tube V4. This combination tube further has an amplifier anode 82 and a screen grid 83. The grid 83 is supplied with D. C. voltage from line 84 over resistance $R_{32}$ and tuning resistance $R_{31}$ which is grounded as at 85 over resistance $R_{30}$. The anode 82 is supplied with D. C. operating current from line 84 over point 86, resistance $R_{28}$, point 87, point 88, resistance $R_{25}$, and point 89. Point 87 of this supply connection is grounded as at 90 over resistance $R_{29}$. It will thus be understood that during N-signal impulses from keyer-receiver 20 because of the negative bias on grid 80, the amplifier portion of combination tube V4 will be driven to cut-off.

In this connection, it should be noted that point 88 of this supply connects with cathode 50 of tube V3, while point 89 over resistance $R_{26}$ connects with point 48, that is with the grid of tube V3.

The steady strength component signal (in this case the N-signal from the keyer-receiver 20 is also fed over coupling transformer T4) to a rectifier tube V5 which has a pair of anodes 92 and 93, and a pair of cathodes 94 and 95. The secondary coil of transformer T4 is in circuit with tube V5, the amplifier circuit of which also comprises a resistance $R_{19}$ with terminal points 95 and 96, terminal point 95 being connected at 97 to the secondary coil 91, terminal point 96 being connected to anodes 92 and 93 and grounded as at 98. Between the anodes 92, 93 and the point 97 and in parallel with the resistance $R_{19}$, is a condenser $C_8$.

The rectified voltage from tube V5 feeds to an amplifier tube V6, that is, to the grid 99 thereof, tube V6 further comprising an anode 100 and a cathode 101. This tube also has a screen grid 102 under D. C. voltage from line 84 through a connection starting from point 103 of line 84 and comprising resistance $R_{39}$, points 104, 105, 106, and resistance $R_{33}$. The anode is supplied from point 103 on line 84 over resistance $R_{39}$, points 104, 105, 106, then over a resistance $R_{36}$, and point 107. The potential of anode 100 is impressed upon grid 55 of amplifier tube V7 over a resistance $R_{37}$ between points 107 and 54.

The cathode 101 is connected to a point 108 between resistances $R_{34}$ and $R_{35}$, the former being grounded as at 109, the latter being connected at 103 to the D. C. supply line 84.

Let it be recalled that under the condition above assumed the keyer-receiver 20 receives only the steady N-signal, while the input-receiver 19 receives the mixed or interlocked signal in which either the A- or the N-component may be the stronger one (depending upon the direction of aberration of the beam). Due to the manner in which the impulses from these receivers affect and influence each other in the monitor system so far above described, there results (as will be more fully explained further below) a separation of A- and N-components of the interlocked signal from the input-receiver 19. It will hereinafter be understood that the separation of the component signals is realized because tubes V7 and V8 are controlled to function in what may be called complementary fashion. That is (a) the tube V8 is controlled to open during N-signal, but to cut off during, or to block out the A-signal, and (b) the tube V7 is controlled to open during A-signal, but to cut off during, or to block out the N-signal.

For the purpose of utilizing the separated component signal impulses in the manner according to this invention, they must each be rectified in order to correlate their respective values or strengths by way of an auxiliary balancing system such as a Wheatstone bridge system. Any differential in the strength of the two separated component signals or their equivalent D. C. voltages may thus be indicated by the corresponding amount of bridge current to be utilized in correcting the directional fault of the beam whereby the bridge current returns to zero.

There will now be described that part of the monitor system, whereby the fault of the beam is compensated by way of rectification of the separated A- and N- signals, and whereby the differential of these voltages is utilized in the balancing or Wheatstone bridge system for indication and correction of the fault.

The isolated A-signal affecting the plate (anode) circuit of tube V7 is fed over the coupling transformer T8 to a rectifier tube V10 which is in circuit with the secondary coil 110 of the transformer. The tube V10 is shown to have a pair of anodes 111 and 112 and a corresponding pair of cathodes 113 and 114. The rectifier circuit of this tube further includes a condenser $C_{19}$ between point 115 of the cathodes and point 116 of the secondary coil 110. In parallel with the condenser is a resistance $R_{49}$ as defined by points 117 and 118. The rectifier tube V10 and circuit convert the A-signal voltage into D. C. voltage of an order proportionate to the strength of the isolated or separated A-component signal, this voltage being represented as between point 117 (negative) and point 118 (positive).

The isolated N-signal affecting the plate (anode) circuit of tube V8 is fed over the coupling transformer T7 to a rectifier tube V9 which is in circuit with the secondary coil 119 of the transformer. The tube V9 is shown to have a pair of anodes 120 and 121, and a corresponding pair of cathodes 122 and 123. This rectifier circuit further comprises a condenser $C_{18}$ between point 124 of the cathodes and point 125 of the secondary coil 119, this end of the coil being grounded as at 126. In parallel with the condenser $C_{18}$ is a resistance $R_{48}$ as defined by points 127 and 128. The rectifier tube V9 and circuit convert the isolated or separated N-signal voltage into D. C. voltage of an order proportionate to the strength of the isolated or separated N-component signal, this voltage being represented as between point 127 (positive) and point 128 (negative).

The differential of the D. C. voltages which represent the separated A- and N-component signals, and which appear across the resistances $R_{49}$ and $R_{48}$ respectively, can now be utilized to influence the balance of a Wheatstone bridge circuit which has a D. C. operating supply from line 58. This auxiliary Wheatstone circuit comprises a resistance $R_{53}$ between points 129 and 130; a resistance $R_{52}$ between points 129 and 131; several resistances between points 130 and 132, namely $R_{54}$ and $R_{56}$, and adjustable resistance $R_{55}$ in parallel with $R_{56}$; and resistance $R_{51}$ plus a variable resistance in the form of electronic tube V11 between points 131 and 132. This tube is shown to have a triple anode 133, 133a, 133b, and correspondingly a triple grid 134, 134a, 134b, and a triple cathode 135, 135a, 135b. Tube $V_{11}$ may be represented by three tubes connected in parallel and it may be any number of tubes depending on the value of bridge current to be controlled.

D. C. operating current is supplied at point 129 to the two parallel branches of the Wheatstone circuit, the opposite point 132 being grounded as at 136.

The bridge current proper varying in proportion to variations of the above-mentioned voltage differential, appears in a connection 137 between points 130 and 131, which may include indicators and remote meters, to be influenced by that current, and other devices such as alarm devices also controlled by that current to effect auxiliary operations. These possibilities are illustrated by meter 138, remote meters 139, a recorder 140 with parallel resistance $R_{57}$, means for deriving auxiliary operations through a relay system are indicated by the solenoid relay switch RL1, and a three-pole switch "S."

The differential of the A- and N-rectified voltages to be derived from the rectifier circuits of tubes $V_9$ and $V_{10}$ respectively is utilized by connecting the voltages against each other and over the grid 134, 134a, 134b of tube $V_{11}$. That is to say, the positive (+) poles of these voltages have an interconnection 141, while the negative (−) pole of the rectified N-signal voltage is grounded as at 126, and the negative pole (−) of the rectified A-signal voltage is connected to the grid 134 of the tube $V_{11}$, the cathode of which has its ground at 136. Between point 117 and the grid 134 is interposed a resistance capacity filter 142 comprising a resistance $R_{50}$ and a pair of condensers $C_{20}$ and $C_{21}$ in parallel with each other, and a ground 143. Variations in the differential between the rectified A- and N-voltages will thus throttle or enhance the flow of D. C. operating current through the tube $V_{11}$ and thereby correspondingly vary the Wheatstone bridge circuit.

That is to say, the tuning is such that, with the A- and N-voltages equal, the Wheatstone bridge will be in balance and no indicating current in the bridge connection will be present. But when the rectified N-signal voltage across resistance $R_{48}$ is the greater one, then the grid of tube $V_{11}$ becomes more positive relative to the cathode, thereby increasing the flow of operating current through that tube, thus unbalancing the Wheatstone bridge and causing a current of corresponding size and direction to flow through the bridge connection 137, namely from point 130 to point 131. Similarly, when the A-signal voltage across resistance $R_{49}$ is the greater one, then the grid of tube $V_{11}$ becomes more negative relative to the cathode, thereby decreasing the flow of operating current through that tube, thus unbalancing the Wheatstone bridge and causing a current of corresponding size and direction to flow through the bridge connection 137, namely from point 131 to point 130.

Somewhat differently described, the effect of the differential of the A- and N-voltages upon the function of the Wheatstone bridge is as follows.

In the condition where the beam has shifted in a direction which brings the on-course or input-receiver 19 relatively more towards or into the A-field (see Fig. 1), the N-component of the on-course signal (mixed signal) is weaker than the A-component, hence in terms of the corresponding rectified voltages, the potential drop or voltage across resistance $R_{48}$ is smaller than that across resistance $R_{49}$. Vice versa, in a condition where the beam has shifted in a direction which brings the on-course or input-receiver relatively more towards or into the N-field, the A-component of the on-course signal is weaker than the N-component, hence in terms of the corresponding rectified voltages the potential drop or voltage across resistance $R_{49}$ is smaller than that across resistance $R_{48}$.

The respective voltage differentials in the two conditions will influence the Wheatstone bridge circuit in the manner just described in the preceding paragraphs to give an indication of the directional fault of the beam.

At $J_1$ is indicated a jack or plug-in device associated with the circuit of tube $V_8$, to check or listen in on the functioning of the rectified N-component signal, which device is shown to include in its circuit a condenser $C_{11}$ and a ground 144. A similar device $J_2$ for checking on the rectified A-component is associated with the circuit of tube $V_7$ and includes a condenser $C_{16}$ and a ground 145.

In parallel with tube $V_1$ to receive the on-course or mixed signal are the electronic tubes $V_2$ and $V_{14}$ to perform some accessory or auxiliary functions presently to be explained.

The tube $V_2$ comprises anode 147, cathode 148, having a resistance $R_8$ with condenser $C_2$ in parallel and a ground 149, a grid 150 having a ground 151 over resistance $R_7$, and connecting over a condenser $C_3$ with the grid $G_1$ of tube $V_1$ as at point 151a. This tube is also shown to have a screen grid 152 connecting at point 153 with the D. C. supply line 72. The anode 147 of tube $V_2$ connects with primary coil 153 of a coupling transformer $T_5$ having a secondary coil 154 having an indicator connection 155, and being in circuit with a resistance $R_9$ and a plug-in or earphone device 156 having a ground 157.

The tube $V_{14}$ has an anode 158, a cathode 159 having a resistance $R_{11}$ in parallel with a condenser $C_6$ and a ground 160, and a grid 161 being grounded as at point 162 over resistance $R_{10}$. The anode 158 of tube $V_{14}$ connects to the primary coil 163 of transformer $T_6$ having a secondary coil 164 which is in circuit with a rectifier tube $V_{15}$ having twin anodes 165 and 166 and corresponding cathodes 167 and 168, with ground 169, the cathodes and the secondary coil 164 having between them a condenser $C_7$. At point 170 between the condenser and the coil connects a resistance $R_{17}$ which at branch point 171 connects with resistance $R_{16}$ leading to branch point 172 from which in turn leads a resistance $R_{15}$ grounded at 173. From point 172 also leads a resistance $R_{14}$ to another branch point 174 from which leads a resistance $R_{12}$ to point 175 on D. C. supply line 39 and a resistance $R_{13}$ to ground 176. From branch point 171 leads a conduit 177 over resistance $R_{18}$ to the grid 178 of an electronic tube $V_{16}$ shown to have an anode 179, a cathode 180 grounded at 181, and a screen grid 182 grounded by way of the cathode 180. From the anode 179 leads a connection 183 to an auxiliary relay control system not further shown except for a relay switch RL2 as part of an interlocking system for preventing interferences with each other of the normal beam signal with a station identification signal, both kinds of signals usually being sent by the transmitter 10 in an alternating continuous sequence of 30-second periods of each. Between the tube $V_{16}$ and the resistance $R_{18}$ is a branch point 184 from which a connection 185 leads over a condenser $C_{25}$ to ground 186.

From the branch point 172 also leads a connection 187 to a recorder 188 grounded at 189.

OPERATION

By reference to Figures 1, 2, 3, there will now be given (A) a relatively condensed description of the operation, and, (B) a more elaborate description of the operation, whereby reference will be had to all the numerically identified details of the wiring diagrams.

(A) Condensed description of the operation

The signal received by the on-course receiver is connected to the terminals marked Input connection. The keyer-receiver output is connected to the terminals marked Keyer connection. For descriptive purposes, assume this receiver to be located in the N-sector and receiving the N-signals considerably stronger than the A-signals. The on-course signal is amplified by tube $V_1$ and fed through an attenuator network to the grids of tubes $V_7$ and $V_8$. Tubes $V_8$ and $V_9$ comprise the channel which will amplify and rectify only the N signal and tubes $V_7$ and $V_{10}$ comprise the channel which will amplify and rectify only the A signal. (Assuming the keyer receiver to be in the N sector.)

Considering the N channel only for the present (tubes $V_8$ and $V_9$): This is to amplify only the N-signal and reject the A-signal, as the combined A- N-signal from the on-course receiver is injected to the grid of tube $V_8$ through condenser $C_{13}$.

The amplified N-signal from the keyer-receiver is rectified by the diode section of tube $V_4$, producing negative D. C. N-pulses which are fed to the grid of the pentode section of tube $V_4$. Tube $V_4$ is a D. C. amplifier. With no bias on the grid of tube $V_4$, the plate draws current through resistor $R_{25}$ which is also common to the grid-cathode circuit of amplifier tube $V_8$. The voltage drop through $R_{25}$ caused by no bias on tube $V_4$, biases tube $V_8$ to cut-off, preventing the tube from amplifying. During the N-signal, the grid of tube $V_4$ is supplied with negative voltage from the diode rectifier. Tube $V_4$ is biased to cut-off, thus the voltage across resistor $R_{25}$ becomes zero and tube $V_8$ functions with normal bias from the cathode resistor $R_{27}$. Therefore, during the N-impulses, tube $V_8$ amplifies, allowing the N-portion of the on-course signal to be amplified. During the remainder of the cycle, tube $V_8$ is cut off, effectively blocking the passage of the A-signal. The N-portion of the received on-course signal is thus amplified in tube $V_8$ and rectified by tube $V_9$. A D. C. voltage appears across resistor $R_{48}$ which is proportional to the intensity of the N-signal received at the on-course receiver. As the A- N-signals are interlocked, the A-portion of the signal is present when the N- is absent. The A-channel functions in a like manner. (See tubes $V_7$ and $V_{10}$.)

The N-signal from the keyer-receiver is rectified by tube $V_5$ into positive D. C. pulses. Tube $V_6$, a D. C. amplifier whose plate circuit resistor $R_{36}$ is common to the grid-cathode circuit of tube $V_7$, is normally biased to cut-off by cathode resistor, voltage divider, resistors $R_{34}$—$R_{35}$. The positive pulses from tube $V_5$ during the N-signal cause tube $V_6$ to draw current through resistor $R_{36}$. The voltage drop across resistor $R_{36}$, therefore, biases tube $V_7$ to cut-off during the N-portion of the cycle, thus blocking passage of the N-signal. As tube $V_6$ is biased to cut-off during the A-interval, there is no voltage drop across resistor $R_{36}$ and tube $V_7$ amplifies.

The A-portion of the received on-course signal is thus amplified in tube $V_7$ and rectified by tube $V_{10}$. A D. C. voltage appears across resistor $R_{49}$ which is proportional to the intensity of the A-signal received at the on-course receiver.

Resistors $R_{48}$ and $R_{49}$ are connected in series such that the polarities of the voltages across them oppose each other. As the voltages across each resistor appear at different times and never at the same time, they are applied to a resistor-capacity filter 142 comprising resistor $R_{50}$ and condensers $C_{20}$—$C_{21}$. This filter smooths out the pulses of opposite polarity and a resultant voltage of zero is obtained when the A- and N-signals are equal. If the N- is stronger, a resultant positive voltage with respect to ground appears across condensers $C_{20}$—$C_{21}$ equal to the difference between the two voltages likewise, when the A- is greater, a resultant negative voltage appears across condensers $C_{20}$—$C_{21}$.

Tube $V_{11}$ comprises one arm of a bridge. The zero center indicating meters are connected in series across the bridge from the tube plates to the junction of the opposite arms resistors $R_{53}$ and $R_{54}$. The grids are connected to the output of the resistance-capacity filter 142. At zero grid voltage the bridge is balanced by resistor $R_{55}$ and no current flows through the meters. A positive or negative voltage applied to the grids will unbalance the bridge and cause a current flow, actuating the meters.

(B) Elaborate description of the operation

For a better understanding of the environment of the invention, it may be remembered that the on-course or interlocked A- and N-signal is not being sent continuously, but that, for practical reasons of orientation, it is interrupted by a station identification signal, the keying of the two signals with respect to each other being such that they form a continuous chain of signals, in which the signals alternate every thirty seconds. This means that the monitor system normally functioning in response to the A- and N-signals, is liable to be disturbed during and by the identification signal period, and that such disturbance must either be ignored or otherwise be compensated for.

For the moment it will suffice to consider what happens during the directional signal period per se:

The on-course or interlocked A- and N-signals enter the input-receiver 19. By way of the coupling transformer $T_1$ and tuning contact 35 the signal is fed into the amplifier tube $V_1$ whence by way of condenser $C_5$ it reaches the splitting point 42 to be fed over the parallel branches 43 and 44 to the grids of the amplifier tubes $V_8$ and $V_7$ respectively.

It is desired according to the invention that the tubes $V_8$ and $V_7$ should be biased in synchronism with the A- and N-signals in such a manner as to block out the A-signal component in the one tube and the N-signal component in the other tube. The desired result to be derived thereby according to this invention from tubes $V_8$ and $V_7$ is that they should produce the separated or isolated component signals which may or may not be of different strength or intensity depending upon whether and in what direction an aberration (directional shifting) of the beam (on-course signal) has occurred.

According to this invention, either the A- or the N-signal per se may be utilized for applying the desired bias to tubes $V_8$ and $V_7$ in the desired synchronism. By way of example, the N-signal received at steady strength by the keyer-receiver 20 will serve this purpose. This signal being fed over the transformer T₂ and the tuning contact 67 to the amplifier tube V₃, reaches a splitting point 69a, and through branches 73 and 74 and the respective transformers T₄ and T₃ reaches the rectifier circuits controlled by tubes V₄ and V₅ respectively. The tube V₄ is shown to have combined a rectifier portion (anodes 77 and 78) and an amplifier portion (anode 82), whereas the tube V₅ is a rectifier tube per se, the rectifier circuit of which is connected with the grid 99 of the amplifier tube V₆. It should be understood that in principle the combined rectifier- and amplifier tube V₄ is the equivalent of the combined or associated tubes V₅ and V₆, and that the respective arrangements are chosen for certain reasons of convenience. Their functional difference in the present monitor system lies in the manner in which the grids 80 (of tube V₄) and 99 (of tube V₆) are connected with the respective rectifier circuits of tubes V₄ and V₅. It will be noted the hook-up of the grids is such that grid 80 will become negative (−) relative to its cathode 79, while grid 99 will become positive (+) relative to its cathode 101. With these kinds of bias on tubes V₄ and V₆, the N-signal from the keyer-receiver 20 will drive tube V₄ to cut-off the D. C. supply current across the tube, while allowing D. C. supply to pass through tube V₆. This means that vice versa during the A-signal period the tube V₄ will pass D. C. current, while the tube V₆ is driven to cut-off. In this connection it should be understood that the rectification of the N-signal in the two parallel rectifier circuits (tube V₄ and tube V₅) converts the N-signal (— — i. e. long-short) from its oscillating form;

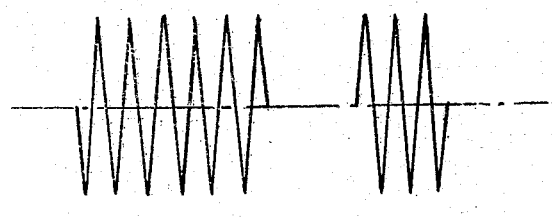

to its D. C. form:

In other words tube V₄ passes D. C. current only during A-signal. The current through tube V₄ thus passes from the supply line 84 over the resistance R₂₈, points 87 and 88, resistance R₂₅, point 89, and over anode 82 and cathode 79 to ground 79a. This current sets up a drop of potential across resistance R₂₅ as between points 88 and 89, impressing a negative potential upon the grid of tube V₈, which drives that tube to cut-off during A-signal only. Thereby it blocks the A-signal component of the on-course signal from input-receiver 19 by preventing its passage through tube V₈ while the N-signal component is free to pass. The reverse happens when tube V₄ cuts off and the drop of potential across resistance R₂₅ disappears removing the negative bias from the grid of tube V₈ to allow the thus separated or isolated N-signal component to pass through tube V₈ in its unrectified form.

Similarly, tube V₆ passes D. C. current only during N-signal. The current through tube V₆ thus passes from the supply line 84 at point 103 over resistance R₃₉, points 104 and 105 and 106, resistance R₃₆, point 107, and over anode 100 and cathode 101 to point 108, and over resistance R₃₄ to ground 109. This current sets up a drop of potential across resistance R₃₆ as between points 105 and 107, impressing a negative potential upon the grid 55 of tube V₇, which drives that tube to cut-off during N-signal only. Thereby it blocks the N-signal component of the on-course signal from input-receiver 19 by preventing its passage through tube V₇, while the A-signal component is free to pass. The reverse happens when tube V₆ cuts off and the drop of potential across resistance R₃₆ disappears removing the negative bias from grid 55 of tube V₇, to allow the thus separated or isolated A-signal component to pass through tube V₈ in its unrectified form.

As a net result, the on-course or mixed signal from the input-receiver 19 has its components separated from each other, as the N-signal component alone passes through tube V₈, while the A-signal component alone passes through tube V₇.

As a result, both component signals while segregated, are now still in their original vibratory form although of a respective strength or intensity which depends upon the degree of aberration, if any, of the beam. By rectifying each component signal, their differentials of strength in terms of currents or voltages can be evaluated according to this invention.

The rectification of the isolated N-signal component by way of transformer T₇ and rectifier tube V₉ being such as to produce a D. C. voltage across resistance R₄₈, and the rectification of the isolated N-signal component by way of transformer T₈ and rectifier tube V₁₀ being such as to produce a D. C. voltage across resistance R₄₉, an indication or evolution of the beam aberration can now be had through the differential, if any, of the respective D. C. voltages by way of the smoothing-out effect of the resistance capacity filter 142.

When the beam 11 (see Fig. 1) shifts from its theoretically predetermined position to the position 11b (in dot-and dash-lines) the N-signal component now appears as a relatively greater rectified voltage across resistance R₄₈, while the relatively weaker A-component signal appears as a relatively smaller rectified voltage across resistance R₄₉.

The differential of these rectified voltages upon the Wheatstone-bridge W impresses upon the grid of tube V₁₁ a potential that is more positive (+) relative to the cathode, and increases the flow of D. C. supply current through the tube. The resulting unbalance in the Wheatstone system produces a current in the bridge connection 137 proper, that is, in a direction from point 130 to point 131.

When the beam 11 (see Fig. 1) shifts to the position 11c (in dotted lines), the A-signal component on the input-receiver becomes relatively stronger than the N-component. Therefore, as the monitor system functions, a relatively greater rectified voltage appears across resistance R₄₉, than across resistance R₄₈. The differential of these voltages reverses the potential of the grid relative to the cathode of tube V₁₁, rendering the grid negative (−), thus throttling the flow of D. C. supply current through the tube. The resulting unbalance of the Wheatstone system produces a current in the bridge connection 137 in a direction opposite to the one arrived at the preceding paragraph, namely from point 131 to 130.

The respective directions of aberration of the beam, being represented by the respective directions of the bridge current through connection 137 appear as indications in meter 138 or in remote meters 139, while the fluctuations may be registered in the recorder 140. A return of the beam as by antenna adjustment to its predetermined position will, therefore, also bring the indicating instruments or meters back to zero.

Any reactions of the Wheatstone system due to beam aberrations may also be utilized to set off an alarm or other responses through an auxiliary relay system indicated by the solenoid controlled relay RL1 and the multiple-pole switch S.

As referred to above under B, the beam signal alternates with the station identification signal, each running for 30 seconds and in a continuous chain with respect to each other. Since the identification signal would cause a false alarm in the monitor system, a precaution to forestall such alarm, lies in the tube $V_{14}$ normally receiving the on-course (A- plus N-) signal in parallel with tube $V_1$ from input-receiver 19. That is to say, as the beam signal disappears, tube $V_{14}$ affects rectifier tube $V_{15}$ and consequently also the amplifier tube $V_{16}$ which actuates the solenoid controlled relay RL2 to forestall the false alarm.

As regard the response of the Wheatstone bridge system to faults affecting the beam signal, it should be understood that such response is not limited to directional fault of the beam or antenna detuning. A response may occur also for instance due to faulty keying or interlocking of the A- and N-signals, absence or poor keying of the station identification signal, or reduction of power output with attendant weakening of the beam signal, in which cases also the balance of the Wheatstone bridge will be disturbed due to differentials between the voltages across resistance $R_{48}$ and resistance $R_{49}$ respectively. In such instances, whether or not the cause of trouble is a directional fault of the beam may be checked through the earphone jack $J_3$ and/or the jacks $J_1$ and $J_2$. Also the recorders 140 and 188 may give an indication of the kind or kinds of trouble that cause the disturbance and give rise to the responsive action of the monitor system.

The use of the Wheatstone bridge system in connection with the separation of the component signals as herein proposed, makes it possible to obtain desired degrees of amplification of the differential voltage as a basis for establishing the monitor circuit.

With a small deviation of the on-course signal the amplitudes of the A- and N-signals differ by only a few percent. Normal methods of measurements would not provide a good indication with only a few percent change.

For example, assume the voltages produced by the on-course receiver 20, by an on-course signal, equals 20 volts of N-signal and 20 volts of A-signal, which is applied to the grids of the amplifier tubes $V_7$ and $V_8$, the voltage appearing at the grid of $V_{11}$ equals zero.

With a 5 percent change between the strengths of the A- and N-signal, one voltage becomes 20.5 volts and the other 19.5 volts (approximately). Assume the two amplifier channels $V_8$, $V_9$, and $V_7$, $V_{10}$, have a gain of 2. The output voltages become 41 volts and 39 volts, producing a differential voltage of 2 volts at the grid of $V_{11}$, which is ample to produce a large variation in the meter indication. However, if a larger meter variation is desired with a 5% change in A- and N-signals, by increasing the channel gains of $V_8$, $V_9$, and $V_7$, $V_{10}$, larger differentials can be obtained. Thus if the gain is made 10, the output voltages become 195 volts and 205 volts, or a difference of 10 volts applied to the grid of $V_{11}$ for a 5% change between A- and N-.

Thus by choosing the gain of the A- and N-amplifier channels, any required sensitivity between course deviation and meter reading can be obtained.

In the modified arrangement of Fig. 4, the keying is effected by means of a distributing or keying or vibrator switch 190 which may alternately close with the contacts 191 and 192 respectively, representing the respective A- and N-channels. The keying switch 190 is controlled by a solenoid 193 which in turn is controlled in synchronism with the transmitter signals. According to the disclosure in Fig. 4, the synchronization of the keyer switch 190 can be effected in two alternative ways.

One way is by energizing or controlling the solenoid 193 directly from the transmitter switch such as is here represented by the switch 194 adapted to alternately close the A- and N-antennae contacts 195 and 196. That is to say, the standard transmitter signal reaches the switch 190 through conductor 197, while a solenoid 198 to control the switch 194 has the leads 199 and 200 connecting it with the standard timer (here not shown).

At points 201 and 202 optional parallel connections lead to energize the solenoid 193 of the keying switch 190. The other alternative is by energizing or controlling the solenoid 193 by rectified A- or N-component pulses. This arrangement comprises a coupling transformer 203 having a primary winding 204 in circuit with the A-signal antennae 195 and a ground 206, and a secondary winding 207 in circuit with a rectifier tube 208, having anode 208a and cathode 208b, and a condenser 209. This rectifier circuit is connected at points 210 and 211 to the leads 212 and 213 of the solenoid 193.

The respective component signal channels leading off from the contacts 191 and 192, comprise elements similar to those of the corresponding portion of the diagram of Fig. 3. One channel leading from contact 191 comprises a conductor 214 terminating in a slidable contact 215 on a resistance 216 one end of which is grounded as at 217, while the other end leads to the grid 218 of an amplifier tube 219 (corresponding to tube $V_8$ in Fig. 3) having an anode 220 and a cathode 221 which is grounded as at 222 and is in parallel with a condenser 223. The anode 220 is connected to one end of the primary coil 224 of a coupling transformer 225 (corresponding to transformer $T_7$ in Fig. 3), the other end of the primary coil being supplied as at point 226 with D. C. operating current from a suitable source such as the one already shown and described in Fig. 3. The secondary coil of this transformer is in circuit with a rectifier tube 227 (corresponding to tube $V_9$ in Fig. 3) comprising anodes 228 and cathodes 229, and with a condenser 230, having a ground at 231. In parallel with the condenser 230 as at points 232 and 233 is a resistance 234.

The other channel leading from contact point 192 comprises conductor 235 leading to point 236 intermediate a resistance 237 having ground 238 and resistance 239 connected to a grid 240 of an amplifier tube 241 (corresponding to tube $V_7$ of Fig. 3) having an anode 242 and a cathode 243 with ground 244 and resistance 245 in parallel with condenser 246. The anode 242 connects with one end of the primary coil 247 of a transformer 248 (corresponding to transformer T3 in Fig. 3), the other end of the primary coil being supplied as at point 249 with D. C. operating current the same as the transformer 225. The secondary coil 250 of transformer 248 is in circuit with a rectifier tube 251 (corresponding to tube V10 of Fig. 3) having anodes 252 and cathodes 253, and with a condenser 254 in parallel with the resistance 254a as at points 255 and 256. The positive points 232 and 255 of the respective rectifier circuits are interconnected as by conductor 257, while the negative points 233 and 256 are connected through a Wheatstone bridge system similar to that shown in Fig. 3, but here shown in a simplified manner. Point 256 is connected to one end of a resistance 258, the other end of which is connected to a condenser 259 grounded at 260 as well as to the grid 261 of a tube 262 having an anode 262a and a cathode 262b.

This tube constitutes in effect a varying resistance in a Wheatstone bridge system including the points 263, 264, 265, 266, the point 266 being grounded at 266'. The branch between points 263 and 264 includes a resistance 267, the branch between points 264 and 265 includes a resistance 268, the branch between points 265 and 266 includes resistances 269 and 270, the latter resistance being in parallel with an adjustable resistance 271, the branch between points 266 and 263 includes a cathode resistance 272 and the tube 262. The bridge or monitor circuit between points 263 and 265 is indicated merely by the showing of a meter 273 instead of the relay connections and ramifications indicated in Fig. 3.

Fig. 4 also includes an input receiver 274 (corresponding to the input receiver 19 in Fig. 3) placed in the path of the beam, a coupling transformer 275 and an amplifier tube 276 (corresponding to transformer T1 and tube V1 in Fig. 3). The receiver 274 is in circuit with the primary winding 277 of transformer 275 the secondary of which is in circuit with resistance 278 grounded as at 279. A sliding contact 280 connects with the grid 281 of tube 276 having an anode 282 and a cathode 283 with resistance 284 and ground 285. The anode 282 connects with a condenser 286 as well as with a resistance 287 fed by the available D. C. operating current as at point 287a, the other side of the condenser 286 being connected with the keyer switch 190.

Fig. 5 shows a modification of the Wheatstone bridge arrangement, in that a second tube 288 is placed in the branch between points 265a and 266a in addition to a resistance 289. Otherwise, there is a resistance 267a between points 263a and 264a, a resistance 268a between points 264a and 265a, resistance 290 and tube 291 between points 266a and 263a. There is a ground at point 266'', and the grid of tube 288 is grounded as at 292. Placing the tubes 288 and 291 in parallel branches of the Wheatstone bridge system will compensate for the change of characteristic of a tube due to aging. That is to say, inasmuch as both tubes age simultaneously, an undue shifting of the balance of the Wheatstone system is thereby avoided.

Fig. 6 shows another modification of the Wheatstone bridge system in that each of two parallel branches of the system comprises a tube, the grids of both tubes being connected with and under the influence of the voltages or voltage fluctuations appearing in the A- and the N-rectifier circuits.

In this way, compensation is effected due to the simultaneous aging of the tubes, while furthermore the response of the system to the voltage differential is rendered more sensitive.

Fig. 6, therefore, shows a coupling transformer 293 (corresponding to the transformer 225 in Fig. 4) in circuit with a rectifier tube 294 and a resistance 295 between points 296 and 297 and having in parallel therewith a condenser 298. A coupling transformer 299 (corresponding to the transformer 247 in Fig. 4) is in circuit with a rectifier tube 300, and with a resistance 301 between points 302 and 303, having in parallel therewith a condenser 304. The positive points 296 and 302 of the respective rectifier circuits are interconnected and grounded as at 305. The negative points 297 and 303 of the respective circuits have connections 306 and 307 respectively with respective grids of the tubes in the Wheatstone bridge system. That is to say, the connection 306 leads to the grid 308 of a tube 309 in the branch between points 263b and 266b, having in addition a cathode resistance 310. The connection 307 leads to the grid 311 of a tube 312 in the branch between points 266b and 265b, having a cathode resistance 313, the point 266b being grounded as at 314. Between the points 263b and 264b is a resistance 315, and between the points 264b and 265b a resistance 316. The connections 306 and 307 each have a filter unit 306a and 307a to smooth out the A- and N-pulses. The filter unit 306a comprises a resistor 306b, a condenser 306c, and ground 306d. The filter unit 307a comprises a resistor 307b, a condenser 307c, and ground 307d.

The Wheatstone bridge systems as shown in Figs. 4, 5, 6 are supplied with D. C. operating current at the respective points 264 (Fig. 4), 264a (Fig. 5), 264b (Fig. 6).

Referring again to Fig. 4, according to the two alternatives shown, the keying switch 190 may be operated by the energizing pulses as received at points 201 and 202 from the transmitter timer (not shown), or else by rectified component signal pulses received at points 210 and 211.

Fig. 7 is a familiar diagram showing the manner in which the A- and N-signals interlock, the interlocking being defined and controlled by the transmitter timer which is not shown.

We claim:

1. A monitor method of indicating fault of a beam signal emanating from a transmitter and composed of interlocking A- and N-signal components, which comprises intercepting and receiving the beam signal in a predetermined stationary locality in the path of a predetermined position of the beam, segregating the A- and N-components of the beam signal thus intercepted by keying influences derived from the transmitter, rectifying the segregated component signals and establishing the differential of their voltages.

2. The method according to claim 1, in which said differential is established by balancing said voltages against each other and establishing a measure of said differential.

3. The method according to claim 1, in which said differential is established by balancing said voltages against each other, and imposing said differential upon and thereby affecting an independently powered auxiliary system.

4. The method according to claim 1, in which the segregation of the component signals is effected by feeding the beam signal to a pair of rectification channels disposed in parallel, while blocking the A-signal component in the one channel and blocking the N-signal component in the other channel.

5. The method according to claim 1, in which the segregation of the component signals is effected by feeding the beam signal to a pair of rectification channels disposed in parallel, which channels are keyed relative to the beam signal components in a manner to block out the A-component in the one circuit and to block out the N-component in the other circuit.

6. The method according to claim 1, in which the segregation of the component signals is effected by feeding the beam signal to a pair of rectification channels disposed in parallel, while effecting the blockage of the A-component in the one channel and the blockage of the N-component in the other channel through bias obtained from one of the component signals being separately fed through channels effecting such blockages.

7. A monitor system for indicating fault of a beam signal emanating from a transmitter and composed of interlocked A- and N-signal components, which comprises an input-receiver disposed in the path of the beam, a pair of input-rectifier circuits disposed in parallel to which said beam signal is fed, keying means controlled from the transmitter to effect blockage of the A-signal in the one circuit and blockage of the N-signal in the other circuit, rectifying means for the segregated A- and N-components whereby the components emerge as D. C. voltages substantially in proportion to the strength of the respective component signals as received in the beam signal, and balancing means for establishing the differential of said D. C. voltages.

8. A monitor system according to claim 7, in which said keying means comprise bias controlling auxiliary electronic circuit means, and means for applying said bias from said auxiliary circuits to said input circuits to effect said blockages.

9. A monitor system according to claim 7, in which said balancing means comprise a Wheatstone bridge system for establishing a bridge current substantially in proportion to said differential.

10. A monitor system according to claim 7 in which said balancing means comprise a Wheatstone bridge system for establishing a bridge current substantially corresponding to said differential, said Wheatstone system comprising an electronic tube in at least one of its branches, and means for applying said voltage differential to the grid of one tube for correspondingly varying the flow of operating current through said tube.

11. A monitor system according to claim 7, in which said balancing means comprise a Wheatstone bridge system for establishing a bridge current substantially corresponding to said differential, relay circuit means associated with the bridge circuit, and alarm means actuated by said relay circuit means.

12. A monitor system according to claim 7, in which the balancing means comprise a resistor-capacity filter for smoothing D. C. voltage pulses of opposite polarity from said input-rectifier circuits.

13. A monitor system according to claim 7, in which the keying means comprise a keyer signal receiving station disposed in an off-beam position, auxiliary electronic circuits controlled by the keyer signal from said keyer receiving station, and means for applying bias from said auxiliary circuits to said input-amplifier circuits to effect said blockages.

14. A monitor system according to claim 7, in which the keying means comprise a keyer signal receiving station disposed in an off-beam position, a pair of rectifier keyer circuits parallel to each other and effective to produce rectified keyer signal pulses adapted to furnish negative and positive bias respectively in synchronism with respective component signals, a pair of keyer amplifier circuits one of which is subjected to said negative and the other to said positive bias to cut-off in synchronism with the respective component signals, bias-controlling means effective between one of said keyer-amplifier circuits and one of said input-amplifier circuits for blocking passage therethrough of the A-signal, and bias-controlling means effective between the other keyer-amplifier circuit and the other input-amplifier circuit for blocking passage therethrough of the N-signal.

15. A monitor system according to claim 7, in which the keying means comprise a keyer signal receiving station disposed in an off-beam position, a pair of keyer-rectifier circuits in parallel to each other and effective to produce rectified keyer signal pulses adapted to furnish negative and positive bias respectively in synchronism with respective component signals, a pair of keyer amplifier circuits, one of which is subjected to said negative and the other to said positive bias to cut off in synchronism with the respective component signals, bias controlling means effective between one of said keyer-amplifier circuits and one of said input-amplifier circuits for blocking passage therethrough of the one component signal, and comprising resistor means in the path of said keyer-amplifier circuit, and connected with and interposed between the grid and the cathode of said one input-amplifier circuit, and bias controlling means effective between the other keyer-amplifier circuit and the other input-amplifier circuit for blocking passage therethrough of the other component signal.

16. In a monitor system for the purpose substantially as herein described, keying means for controlling an input amplifier circuit, comprising as a subcombination a keyer signal receiving station disposed in an off-beam position, a keyer rectifier circuit coupled with the keyer receiving station, and adapted to furnish bias in synchronism with said keyer signal, a keyer amplifier circuit controlled by said bias to open and cut-off, and bias controlling means effective between said keyer-amplifier circuit and said input-amplifier circuit comprising resistor means in the path of said keyer-amplifier circuit and connected with and interposed between the grid and the cathode of said input-amplifier circuit, whereby the cut-off of said keyer-amplifier circuit places said grid and cathode at substantially even potential effecting in turn the opening of said input-amplifier circuit, while the opening of said keyer-amplifier circuit places bias upon said grid effecting cut-off of said input-amplifier circuit.

17. A monitor system for indicating fault of a beam signal of a transmitter composed of interlocked A- and N-signal components, which comprises an input-receiver disposed in the path of the beam, a pair of parallel signal channels associated with said receiver, means associated with the one channel for discriminating against the A-signal component, means associated with the other channel for discriminating against the N-signal component, means for establishing the differential of strength between the two-component signals emerging from the respective channels, and keying means for controlling said discriminating means from the transmitter.

18. A monitor system according to claim 7, in which the keying means to effect the segregation of the component signals into parallel channels comprise switching means interposed between said input receiver and said channels and adapted and operable to alternately establish operative connection between said receiver and the one or the other channel, and control means for actuating said switching means in synchronism with the signals.

19. A monitor system according to claim 7, in which said balancing means comprise a Wheatstone-bridge system for establishing a bridge current substantially in proportion to said differential, said Wheatstone system comprising an electronic tube in each of two of branches, and means for applying the differential to the grids of said tubes.

ALBERT E. THEIS.
WARREN ANTHONY WIENER.